UNITED STATES PATENT OFFICE.

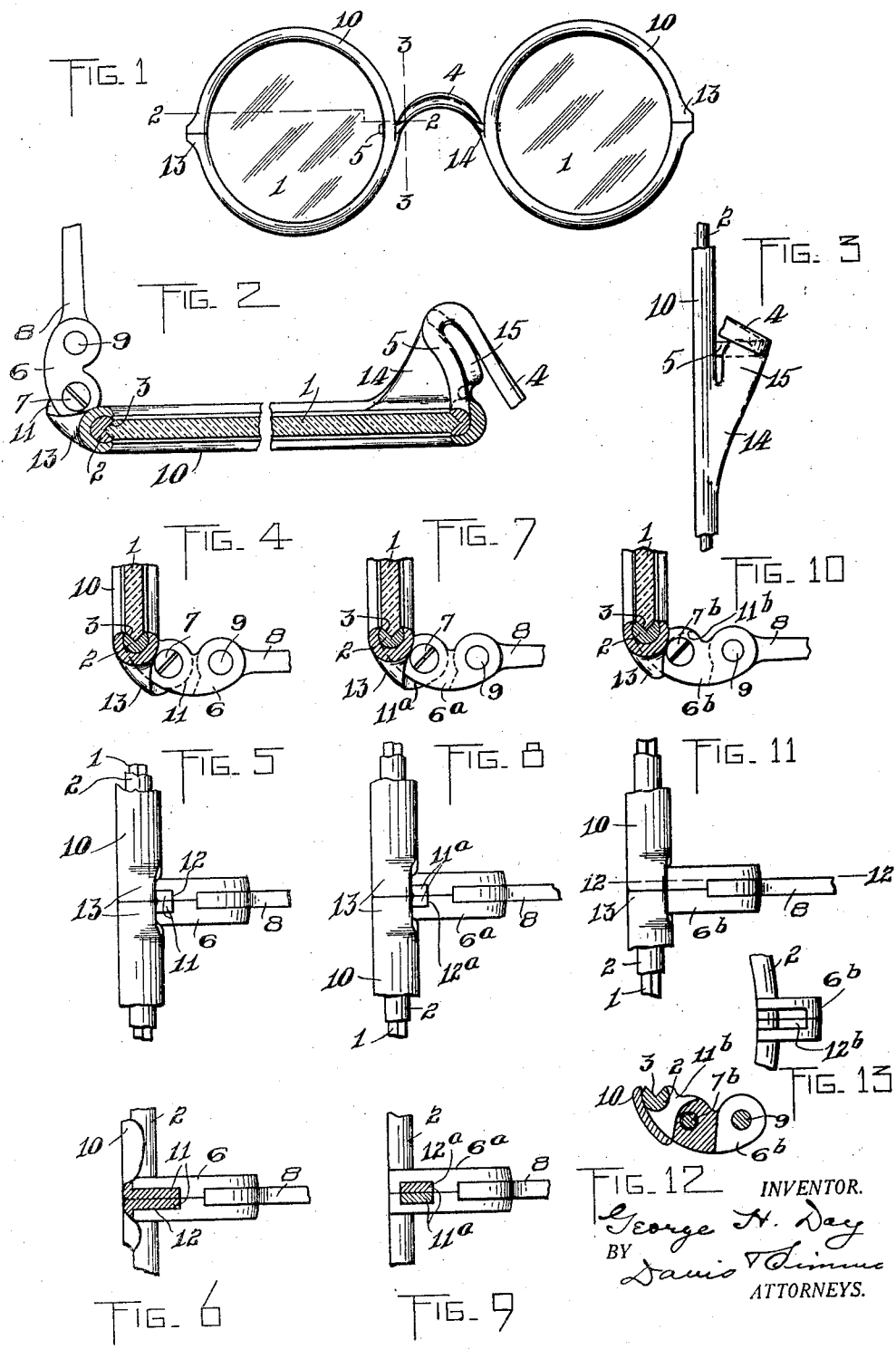

GEORGE H. DAY, OF ROCHESTER, NEW YORK.

OPHTHALMIC MOUNTING.

1,335,318. Specification of Letters Patent. Patented Mar. 30, 1920.

Application filed December 1, 1919. Serial No. 341,676.

*To all whom it may concern:*

Be it known that I, GEORGE H. DAY, a citizen of the United States, and resident of Rochester, in the county of Monroe and State of New York, have invented certain new and useful Improvements in Ophthalmic Mountings, of which the following is a specification.

The present invention relates to ophthalmic mountings and more particularly to the type in which each lens frame is formed by an inner metallic rim and an outer non-metallic rim, an object of this invention being to provide a simple and effective means for securing the ends of the non-metallic rims so as to hold the latter to the metallic rims. Another object of the invention is to so construct the metallic rim that when the mounting is viewed from the front, the metal of the terminals will not be visible. A still further object of the invention is to provide the non-metallic rims with nose bearing portions for coöperating with the nose of the wearer.

To these and other ends, the invention consists of certain parts and combinations of parts, all of which will be hereinafter described, the novel features being pointed out in the appended claims.

In the drawings:

Figure 1 is a front view of a mounting constructed in accordance with this invention;

Fig. 2 is an enlarged sectional view on the line 2—2, Fig. 1;

Fig. 3 is an enlarged section on the line 3—3, Fig. 1;

Fig. 4 is a fragmentary section through the mounting adjacent one of the splits;

Fig. 5 is a fragmentary side view of the mounting adjacent to one of the splits;

Fig. 6 is a fragmentary view of the metallic frame shown in Figs. 4 and 5, the non-metallic frame being shown in section.

Fig. 7 is a fragmentary horizontal section of another embodiment of the invention;

Fig. 8 is an edge view of the embodiment shown in Fig. 7;

Fig. 9 is a fragmentary side view of the metallic rim showing the non-metallic portions in section;

Fig. 10 is a fragmentary horizontal section through another embodiment of the invention;

Fig. 11 is a fragmentary side view of the embodiment shown in Fig. 10.

Fig. 12 is a section on the line 12—12, Fig. 11; and

Fig. 13 is a fragmentary side view of the inner metallic rim adjacent the split of the embodiment shown in Figs. 10 to 12 inclusive.

Referring first to the embodiment shown in Figs. 1 to 6 inclusive, 1 indicates the lenses secured in two lens frames, each embodying an inner metallic rim 2 and an outer non-metallic rim 10. Each inner rim 2 is formed with an internal groove 3 to receive a lens 1. The metallic rims are, in this instance connected by a bridge which comprises an arched or bridging portion 4 having forwardly extending pliable arms 5 at the ends thereof connecting with the rims 2 preferably at the rear edges of the latter. These rims 2 are split and have at the split, terminals 6 adapted to be secured together by a screw 7 to hold the metallic rims together and to hold the temples 8 between the terminals upon a pivot 9. The non-metallic rims 10 surrounding the metallic rims are formed of celluloid or other suitable non-metallic material, each non-metallic rim being grooved to receive a metallic rim and preferably to cover the same except at the groove in such metallic rim.

One feature of this invention is the means by which the non-metallic rims are secured about the metallic rims. This means in this instance, comprises portions on the non-metallic rims secured between the split ends of the metallic rims. These portions in this instance are in the form of laterally turned extensions 11 arranged on the non-metallic rim and projected between the terminals 6, the terminals being preferably notched or recessed at 12 on their opposed faces adjacent their connections with the metallic rim to receive the extensions 11 and the screw 7 being passed through these extensions 11. As an additional feature the non-metallic rim may be bent at 13 to cover the forward ends of the terminals 6 so that the metal of the terminals will not be visible from the front of the lenses and to secure the best results it is preferred to deflect the terminals rearwardly so that they will lie directly in rear of the portions 13 of the non-metallic rims.

In the embodiments shown in Figs. 7 to 9 inclusive, the recesses 12$^a$ in the terminals 6$^a$ do not extend to the metal of the rim 2 and the extensions 11$^a$ are narrower but are secured by a screw 7 in the manner shown in the embodiment illustrated in Figs. 1 to 6. In the embodiment shown in Figs. 10 to 13 the terminals $6^b$ are provided with recesses $12^b$ to one side of the screw $7^b$ and the non-metallic rim 10 covers the forward ends of the terminals at 13 and has extensions $11^b$ so formed that they lie in the recesses $12^b$ between the ends of the metallic rim 2 and the screw $7^b$, the extensions $11^b$ being reduced between their ends so that an interlocking connection is provided which will retain the ends of the non-metallic rim against movement when the terminals are secured together by the screw $7^b$, but will permit the ready disconnection of the extensions from the terminals when the terminals are separated.

Another feature of this invention is the provision of nose bearing surfaces on the non-metallic rims. These nose bearing surfaces are formed preferably from and integrally with the material of which the non-metallic rims 10 are made. In this instance, each nose bearing surface indicated at 14 projects rearwardly from the rear edge of a non-metallic rim below the bridge 4 and has a portion 15 extending upwardly at the upper part of the nose bearing surface, this upwardly extending portion being projected between the adjacent end of the bridging portion 4 and the pliable forward extending arm 5, the forward edge of this upwardly projecting portion 15 being separated from the adjacent portion of the rim 10 so that it may be bent or deflected with reference to said non-metallic rim in order to conform comfortably to the shape of the nose of the wearer. The rear edge fits snugly at the bend between the bridging portion and the pliable portion. The best results are secured by having this nose bearing portion form a substantial continuation of the nose bearing surface of the bridging portion 4. As this projecting end lies between the end of the bridging portion and the pliable forwardly extending arm 5, it is protected against blows while at the same time it may be supported by the pliable portion 14 and be adjusted laterally with the bend.

From the foregoing it will be seen that there has been provided an ophthalmic mounting in which the ends of a split non-metallic rim are clamped between the terminals on the split metallic rim. In addition to being clamped, the ends of the non-metallic rim are secured against accidental displacement. The non-metallic rim is so formed as to cover the front faces of the terminals and acts as a cushion should the mounting be dropped. There has also been provided a non-metallic rim having a nose bearing surface formed integrally therewith and projecting so as to form a continuation of the bridging portion of the mounting. The upwardly projecting portion may lie between an end of the bridging portion and the pliable portion which extends from the bridging portion to a metallic rim so that the nose bearing portion will be protected and supported and will be adjusted with the bend.

What I claim as my invention and desire to secure by Letters Patent is:

1. An ophthalmic mounting comprising a split inner metallic rim and a split outer non-metallic rim having portions held between the ends of the inner metallic rim.

2. An ophthalmic mounting comprising a split inner metallic rim having rearwardly extending terminals at the split, and a split outer non-metallic rim having extensions at the split held between the terminals of the metallic rim.

3. An ophthalmic mounting comprising a split inner metallic rim having rearwardly extending terminals at the split, and a split outer non-metallic rim covering the forward end of the terminals and having extensions at the split held between the terminals.

4. An ophthalmic mounting comprising a split inner metallic rim having rearwardly extending terminals, a screw fastening said terminals together, and a split outer non-metallic rim having extensions at the split held between the terminals and secured by the screw.

5. An ophthalmic mounting comprising a split inner metallic rim having rearwardly extending terminals at the split formed with recesses in their opposed faces, and a split non-metallic rim having extensions at the split received in the recesses in the terminals.

GEORGE H. DAY.